(12) United States Patent
Kharbanda et al.

(10) Patent No.: US 12,387,247 B2
(45) Date of Patent: *Aug. 12, 2025

(54) FINDING AND FILTERING ELEMENTS OF A VISUAL SCENE

(71) Applicant: Google LLC, Mountain View, CA (US)

(72) Inventors: Harshit Kharbanda, Mountain View, CA (US); Christopher Kelley, Mountain View, CA (US); Louis Wang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,084

(22) Filed: Feb. 6, 2023

(65) Prior Publication Data

US 2023/0259993 A1     Aug. 17, 2023

Related U.S. Application Data

(63) Continuation of application No. 17/309,263, filed as application No. PCT/US2019/061202 on Nov. 13, 2019, now Pat. No. 11,574,473.

(Continued)

(51) Int. Cl.
*G06F 3/048* (2013.01)
*G06F 3/0482* (2013.01)
(Continued)

(52) U.S. Cl.
CPC ....... *G06Q 30/0282* (2013.01); *G06F 3/0482* (2013.01); *G06F 16/953* (2019.01);
(Continued)

(58) Field of Classification Search
CPC . G06Q 30/0282; G06F 3/0482; G06F 16/953; G06F 18/2113; G06F 18/40; G06V 20/00; G06V 20/20; G06V 30/10
See application file for complete search history.

(56) References Cited

U.S. PATENT DOCUMENTS 9,135,277 B2    9/2015  Petrou
10,043,069 B1 * 8/2018  Liu ..................... G06V 10/235
(Continued)

FOREIGN PATENT DOCUMENTS

CN    102761668    10/2012
CN    103914539     7/2014
(Continued)

OTHER PUBLICATIONS

Anonymous, "Breakthrough Mobile Imaging Experiences", 2014 Qualcomm Technologies, Inc., Jan. 7, 2015, 26 pages.
(Continued)

*Primary Examiner* — Aleksey Olshannikov
(74) *Attorney, Agent, or Firm* — DORITY & MANNING, P.A.

(57) ABSTRACT

In a general aspect, a method can include receiving, by an electronic device, a visual scene; identifying, by the electronic device, a plurality of elements of the visual scene; and determining, based on the plurality of elements identified in the visual scene, a context of the visual scene. The method can further include applying, based on the determined context of the visual scene, at least one filter to identify at least one element of the plurality of elements corresponding with the at least one filter; and visually indicate, in the visual scene on a display of the electronic device, the at least one element identified using the at least one filter.

20 Claims, 10 Drawing Sheets

Related U.S. Application Data

(60) Provisional application No. 62/771,129, filed on Nov. 25, 2018.

(51) Int. Cl.

| | | |
|---|---|---|
| *G06F 16/953* | (2019.01) | |
| *G06F 18/2113* | (2023.01) | |
| *G06F 18/40* | (2023.01) | |
| *G06Q 30/0282* | (2023.01) | |
| *G06V 20/00* | (2022.01) | |
| *G06V 20/20* | (2022.01) | |
| *G06V 30/10* | (2022.01) | |

(52) U.S. Cl.
CPC .......... *G06F 18/2113* (2023.01); *G06F 18/40* (2023.01); *G06V 20/00* (2022.01); *G06V 20/20* (2022.01); *G06V 30/10* (2022.01)

(56) References Cited

U.S. PATENT DOCUMENTS

| | | | | |
|---|---|---|---|---|
| 2008/0082317 A1* | 4/2008 | Rosart | ............... | G06F 40/263 |
| | | | | 704/8 |
| 2012/0062596 A1 | 3/2012 | Bedi et al. | | |
| 2013/0061148 A1* | 3/2013 | Das | ............... | G06V 20/63 |
| | | | | 715/738 |
| 2013/0085345 A1 | 4/2013 | Geisner et al. | | |
| 2013/0218721 A1* | 8/2013 | Borhan | ............... | G06Q 30/02 |
| | | | | 705/26.41 |
| 2014/0172408 A1 | 6/2014 | Vukosavljevic et al. | | |
| 2014/0344745 A1* | 11/2014 | Possing | ............... | G06Q 10/109 |
| | | | | 715/772 |
| 2015/0134318 A1* | 5/2015 | Cuthbert | ............... | G06F 40/58 |
| | | | | 715/231 |
| 2016/0005189 A1* | 1/2016 | Gray | ............... | G06V 30/413 |
| | | | | 345/633 |
| 2016/0100101 A1* | 4/2016 | Cohen | ............... | H04N 23/632 |
| | | | | 348/207.1 |
| 2016/0162971 A1 | 6/2016 | Peterson et al. | | |
| 2017/0255614 A1 | 9/2017 | Vukosavljevic et al. | | |

FOREIGN PATENT DOCUMENTS

| | | |
|---|---|---|
| CN | 105447109 | 3/2015 |
| CN | 107609914 | 1/2018 |
| CN | 107730402 | 2/2018 |
| CN | 108491839 | 9/2018 |

OTHER PUBLICATIONS

Invitation to Pay Additional Fees for PCT Application No. PCT/US2019/061202, mailed on Feb. 17, 2020, 13 pages.
International Search Report and Written Opinion for PCT Application No. PCT/US2019/061202, mailed Jun. 24, 2020, 15 pages.
Machine Translated Chinese Search Report Corresponding to Application No. 201980077221 on Apr. 3, 2024.
Machine Translated Chinese Search Report Corresponding to Application No. 201980077221.X on Aug. 15, 2024.

* cited by examiner

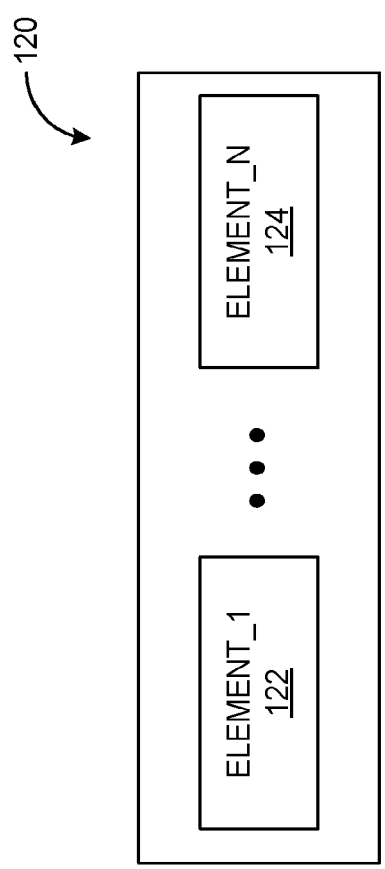

FINDING AND FILTERING ELEMENTS OF A VISUAL SCENE

PRIORITY CLAIM

This application is a continuation of U.S. application Ser. No. 17/309,263, filed on May 13, 2021, now U.S. Pat. No. 11,574,473, which is a national stage application of International Application No. PCT/US19/61202 filed on Nov. 13, 2019, which claims priority to, and the benefit of, U.S. Provisional Application No. 62/771,129, filed on Nov. 25, 2018, each of the above-identified applications being incorporated herein by reference in their entirety.

TECHNICAL FIELD

This document relates, generally, to approaches for finding and filtering elements included in a visual scene, such as to identify elements of interest to a user.

BACKGROUND

Electronic devices, such as smartphones and tablets, continue to evolve and provide consumers (users, etc.) with new and/or improved functional capabilities. For instance, such devices can capture a visual scene (e.g., a real-time, multiple frame view, a single frame photograph view, etc.), such as using a camera included in the device, or by accessing stored photographs. Such devices, using artificial intelligence, computer-vision and/or machine-learning can identify elements (text and/or objects) within a given view and provide (and/or allow a user to obtain) information on those identified objects. Possibilities exist, however, for additional approaches for providing information relevant to a user (or users) for elements (e.g., objects, text, etc.) within a given visual scene or view.

SUMMARY

In a general aspect, a method can include receiving, by an electronic device, a visual scene; identifying, by the electronic device, a plurality of elements of the visual scene; and determining, based on the plurality of elements identified in the visual scene, a context of the visual scene. The method can further include applying, based on the determined context of the visual scene, at least one filter to identify at least one element of the plurality of elements corresponding with the at least one filter; and visually indicate, in the visual scene on a display of the electronic device, the at least one element identified using the at least one filter.

The method may include the following optional features. The visual scene may be one of: a multi-frame real-time view captured by a camera of the electronic device; or a single frame photograph. Applying the at least one filter may include applying a filter based on input from a user. The input from the user may include at least one of: text input; spoken input; or inferred input associated with the user, the inferred input being determined from actions of the user using machine-learning. The determining the context of the visual scene is further based on input from a user. Determining the context of the visual scene may be further based on a geographic location of the electronic device. Identifying the plurality of elements of the visual scene may include at least one of text recognition or image recognition. The visual scene may be a multi-frame, real-time view captured by a camera of the electronic device; and the at least one element may be identified using the at least one filters changes as the multi-frame, real-time view changes. A filter of the at least one filter applied may be applied in response to a respective selection. A filter of the at least one filter may be selectable from a menu on a display of the electronic device. Identifying an element of the visual scene may include: identifying, using computer-vision, the element; and obtaining, using an Internet search, at least one detail associated with the identified element; and applying the at least one filter includes applying the at least one filter to the at least one detail obtained from the Internet search. The method may further comprise receiving a selection of a visually indicated element of the at least visually indicated element; and in response to receiving the selection, displaying, on a display of the electronic device, information corresponding with the selected element. The electronic device may include at least one of: a smartphone; a laptop computer; a netbook computer; a tablet computer; augmented-reality glasses; or a head-mounted display.

In another aspect, an electronic device may comprise a memory storing instructions; and a processor configured to execute the instructions to cause the electronic device to: receive a visual scene; identify a plurality of elements of the visual scene; determine, based on the plurality of elements identified in the visual scene, a context of the visual scene; apply, based on the determined context of the visual scene, at least one filter to identify at least one element of the plurality of elements corresponding with the at least one filter; and visually indicate, in the visual scene on a display of the electronic device, the at least one element identified using the at least one filter.

The device may comprise the following optional features. The device may further comprise a camera configured to capture the visual scene, the visual scene being one of: a multi-frame real-time view; or a single frame photograph. The device may further comprise at least one input device, wherein applying the at least one filter includes applying at least one filter based on input received via the at least one input device. The received input may include at least one of: text input; spoken input; or inferred input associated with a user, the inferred input being determined from actions of the user using machine-learning. Determining the context of the visual scene may be further based on input from a user. Determining the context of the visual scene may be further based on a geographic location of the electronic device. Identifying the plurality of elements of the visual scene may include at least one of text recognition or image recognition. The visual scene may be a multi-frame, real-time view captured by a camera of the electronic device; and the at least one element identified using the at least one filter changes as the multi-frame, real-time view changes. A filter of the at least one filter may be applied in response to a respective selection received via an input device of the electronic device. A filter of the at least one filter may selectable from a menu on a display of the electronic device. Identifying an element of the visual scene may include: identifying, using computer-vision, the element; and obtaining, using an Internet search, at least one detail associated with the identified element; and applying the at least one filter includes applying the at least one filter to the at least one detail obtained from the Internet search. The device may be further configured to receive a selection of a visually indicated element of the at least one visually indicated element; and in response to receiving the selection, displaying, on a display of the electronic device, information corresponding with the selected element.

In a further aspect, a computer-readable medium having instructions stored thereon, the instructions, when executed by a processor of an electronic device, cause the electronic device to: receive a visual scene; identify a plurality of elements of the visual scene; determine, based on the plurality of elements identified in the visual scene, a context of the visual scene; apply, based on the determined context of the visual scene, at least one filter to identify at least one element of the plurality of elements corresponding with the at least one filter; and visually indicate, in the visual scene on a display of the electronic device, the at least one element identified using the at least one filter.

It will be appreciated that features described in the context of one aspect may be combined with features described in the context of another aspect. For example, the electronic device may be configured to perform features according the method aspect and the computer-readable medium may have instructions to cause an electronic device to perform features according to the method aspect.

Aspects may provide identification of elements or filtering of a visual scene in order to assist a user in performing a technical task thereby providing a guided human-machine interaction process. The identification and/or filtering may provide the user with real-time information regarding the internal state of a system.

BRIEF DESCRIPTION OF DRAWINGS

FIG. 2 is a block diagram schematically illustrating a visual scene that can be analyzed and filtered using the approaches described herein.

Like reference symbols in the various drawings indicate like elements.

DETAILED DESCRIPTION

Figure 1:
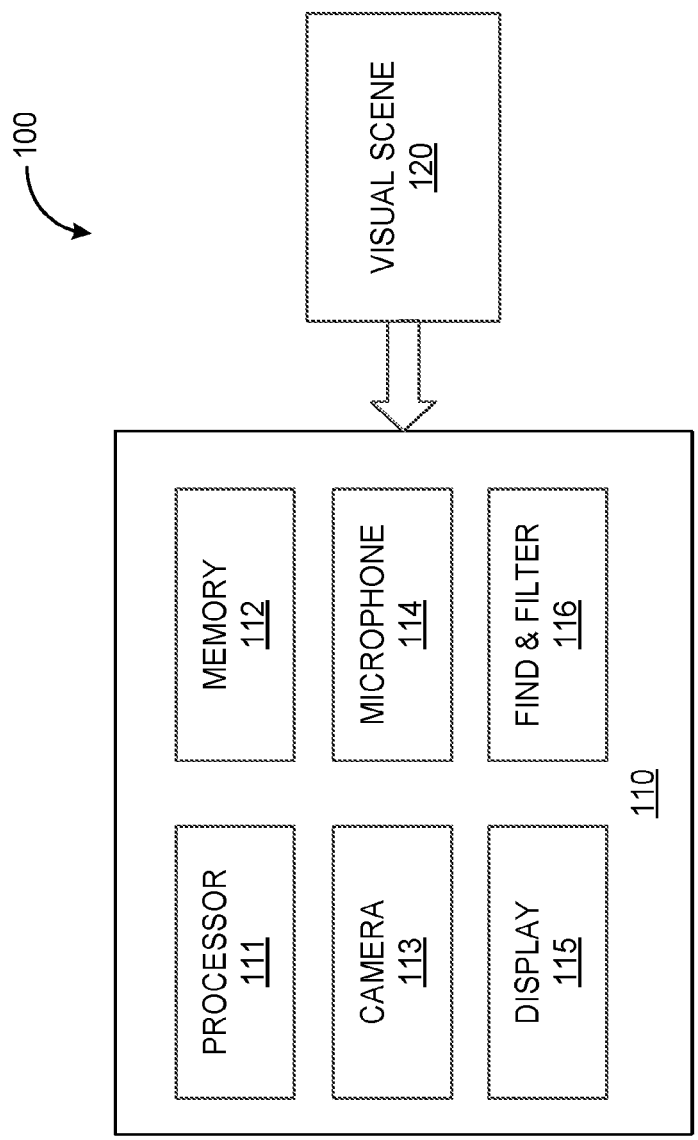
FIG. 1 is a block diagram illustrating a system, according to an example implementation.

This document describes example approaches for finding and filtering elements of a visual scene. The approaches described herein can be implemented using an electronic device, such as a smartphone, a tablet computer, augmented reality (AR) glasses, a laptop computer, a netbook computer, etc. For instance, a user interface (UX) can be provided on an electronic device (e.g., as part of associated find and filter functionality), where the UX can be configured to display a visual scene and apply filters to that visual scene. Applying such filters can include identifying items within the visual display that are of interest (based on a user intent corresponding with the applied filters, which can be selected and/or configured by the user). The approaches described herein can also include visually indicating (on a display of the electronic device) the specific elements of the visual scene that correspond with the applied filters, such as by highlighting items, applying icons to items, obfuscating (e.g., dimming) portions of the visual scene in correspondence with the applied filters, etc. In some implementations, an electronic device implementing such approaches can operate in conjunction with one or more other devices, such as one or more server computers (e.g., Internet servers, database servers, machine learning servers, etc.), or other appropriate devices, such as those described below with respect to FIG. 8.

In the example implementations described herein, computer vision and/or machine learning can be used to identify (find, locate, etc.) and recognize individual elements in a visual scene that is provided to (received by, accessible to, etc.) an electronic device, segment those identified elements into individual elements, and track the segmented individual elements. In some implementations, such a visual scene can be a multi-frame, real-time visual scene captured (dynamically captured) by a camera of the electronic device. In some implementations, a visual scene can be in the form of a single-frame image (e.g., a photograph) that is stored on, or provided to the electronic device. Identifying elements of a visual scene can include performing text recognition and/or image recognition on the visual scene. Also, the electronic device (e.g., working in conjunction with one or more other devices) can determine a context of the visual scene (e.g., using machine-learning, artificial intelligence, etc.) based on recognized text, recognized objects, a geographic location (geo-location) of the visual scene (e.g., as determined by geo-location device included in the electronic device), and/or other information, such as user input. For instance, context of a visual scene can be determined based on comparison of text recognized in the visual scene with known vocabularies, comparison of objects identified in the visual scene with databases of know images, a geo-location associated with the visual scene, filters applied by the user, etc.

For example, in some implementations, context can be determined from one or more factors associated with a given visual scene. The context can be determined, for example, by applying a first weight to a first factor and a second weight to a second factor, and the weighted factors can be used as the context that can be used to filter. For instance, factors that can be used to determine context of a visual scene can one or more of: a geographic location of the visual scene (e.g., as determined by a device capturing the scene, or from another source); identification of object in the visual scene, text recognized in the visual scene, input from a user (e.g., including previous user input that can be analyzed using machine learning); previous activities of a user; responses to queries from the device regarding the visual scene; a specifically declared user intent (e.g., a user may indicate they are looking for a particular item in a store); among any number of other factors.

For instance, a user could use a camera of an electronic device to capture (view, etc.) an image of a menu of a particular restaurant. Using the approaches described herein, the image of the menu could be analyzed, including recognition of text on the menu, recognition of logos on the menu, etc. Comparison of the recognized text with known vocabularies may indicate that the text is describing restaurant dishes. Comparison of the recognized logos (or other images included in the menu) with known images could match known logos (or images) associated with the particular restaurant. Further, a geo-location of the electronic device could indicate that the electronic device is at (or near) the particular restaurant. Based on the foregoing analysis, the electronic device could determine that a context of the visual scene is a view of the menu for the particular restaurant. Contexts for other visual scenes can be determined using similar approaches.

Filters, e.g., implemented by (implemented in, etc.) a UX of the electronic device can allow a user of the electronic device to explicitly declare intent (provide an indication of what content they are interested in) and, as a result, control their view of the visual scene and how that visual scene gets altered as a result of application of at least one filter. That is, in some implementations, filters, such as described herein, can enable a user to filter multiple sources of content and to only view (or visually indicate) certain objects or elements in a view of a given visual scene (e.g., as presented in a UX). Filters applied to a visual scene can be selectable by a user, such as from within a UX implemented on the electronic device, such as the UXs described herein.

In some implementations, a filter applied to a visual scene by an electronic device can be a global filter, or a filter that is not specifically based on a context of a visual scene being filtered. Global filters can, for example, be language translation filters, currency conversion filters, find filters (e.g., to find a specific word). In some implementations, a filter applied to a visual scene can be a contextual filter that is based on a context of a visual scene and/or input of a user. For instance, in the example above of a restaurant menu context, a contextual filter may be applied (e.g., when selected by a user) to identify popular dishes on the menu (e.g., based on reviews obtained from an Internet search). In some implementations, contextual filters may be applied based on input of a user (e.g., spoken input, text input, inferred intent from a user's previous actions, etc.). For instance, a user may request that a view of a restaurant menu be filtered to identify specific items, such as items including, or not including items the user is allergic to (e.g., to find gluten-free items), or an option to apply such a filter can be provided to a user based on know allergies of the user (e.g., based on previous actions of the user). In some implementations, users can select (apply, etc.) multiple filters together, to identify as much, or as little content as they would like to have visually indicated in a given visual scene.

As noted above, and discussed further below, in some implementations, an electronic device can include a UX that allows a user to view a visual scene (e.g., a real-time, multi-frame view, a single frame photographic view, etc.), and choose elements of the visual scene (e.g., declare intent using one or more filters) that the user would like identified (highlighted, etc.) or removed (obfuscated, dimmed, etc.). The UX can be configured to provide the user a view of the respective visual scene (e.g., within the UX on a display of the electronic device) with visual indications corresponding with the user's declared intent (e.g., corresponding with the one or more applied filters). Prior to applying the one or more filters, the electronic device can (e.g., working in conjunction with one or more servers accessible to the electronic device) analyze the respective visual scene to identify individual elements (e.g., text, groupings of text, objects, etc.) of that visual scene, and segment the individual elements. The one or more filters (corresponding with a user's declared intent) can then be applied to the segmented objects, and appropriate visual indications (highlights, icons, obfuscation, dimming, etc.) can be applied to a view of the visual scene in the UX in correspondence with the applied filters. In implementations where the visual scene is a real-time view, the identified and segmented elements can be tracked (along with associated visual indications) by the electronic device a user looks around the visual scene (e.g., with a camera of the electronic device).

As noted above, computer-vision, machine-learning and/or artificial intelligence can be used identify, segment and track of elements included in a visual scene, as well as understand the context of the visual scene. Example approaches for performing such machine learning are discussed below with respect to FIGS. 6 and 7. It will be appreciated, however, that these implementations are discussed by way of example and for purposed of illustration, and other machine learning approaches can be used. The particular machine learning approach will depend, at least in part on the particular implementation, the particular image or visual scene being analyzed, etc.

FIG. 1 is a block diagram illustrating a system 100 according to an example implementation. As shown in FIG. 1, the system 100 includes an electronic device 110 and a visual scene 120 that can be captured by, provided to, or is otherwise accessible by the device 110. Depending on the particular implementation, the device 110 can be a smartphone, a tablet computer, augmented reality (AR) glasses, a laptop computer, a netbook computer, etc. In some implementations, the system 100 can also include one or more other electronic device, network connections, etc., (such as described, e.g., with respect to FIG. 8). In some implementations, the device 110 can work in conjunction with such additional devices to implement the approaches described herein.

In some implementations, the visual scene 120 can be a multi-frame, real-time visual scene captured (dynamically captured) by a camera of the electronic device. In some implementations, the visual scene 120 can be a single-frame image (e.g., a photograph) that is stored on, or provided to the electronic device. In some implementations, the visual scene 120 an take other appropriate forms, such as a video stream, etc.

As shown in FIG. 1, the electronic device 110 can include a processor 111, a memory 112, a camera 113, a microphone 114 and a display (e.g., a touchscreen display) 115. The device 110 of FIG. 1 is also illustrated as including a find & filter (FF) block 116, which can implement a UX and provide associated functionality for implementing approaches for finding and filtering elements included in a visual scene, such as the approaches described herein. While shown as a separate block in FIG. 1, at least some elements, or portions, of the FF block 116 can be included in and/or implemented by other elements of the device 110, or other devices, such as servers that are operationally coupled with the device 110.

For example, the FF block 116 can include machine readable instructions that are stored in the memory 112 and executed by the processor 111 (e.g., to implement the UX or other functions of the FF block 116). The FF block 116 can also work in conjunction with other elements of the device 110, such as the camera 113 (e.g., to capture the visual scene 120), the microphone 114 (e.g., to receive input, or declared intent from a user), and/or the display (e.g., to provide a UX and/or a view, filtered or unfiltered, of the visual scene 120). Further, in some implementations, operations of the FF block 116 can be implemented as a result of the device 110 working in conjunction with one or more other devices (e.g., servers, etc.) to perform computer-vision, machine-learning and/or artificial intelligence tasks (operations, etc.) to identify, segment and/or track of elements included in the visual scene 120 (e.g., from frames of the visual scene 120 identified by the FF block 116).

FIG. 2 is a block diagram that schematically illustrates an example of the visual scene 120 that can be analyzed and filtered using the approaches described herein. As shown in FIG. 2, the visual scene 120 includes a plurality of elements, Element_1 122 through Element_N 124, where N can be a number of elements in the visual scene 120. For purposes of illustration, the following discussion of FIG. 2 is made with further reference to FIG. 1. It will be appreciated that this discussion is given by way of example.

Individual elements of a given visual scene 120 will depend on the particular implementation. Using the approaches described herein, the visual scene 120 can be captured by (e.g., the camera 113), or otherwise provided to the device 110. The device 110 (e.g., using the FF block 116) can analyze the visual scene to identify each of the elements Element_1 122 through Element_N 124 of the visual scene 120, segment those elements, understand a context of the visual scene, apply one or more filters (e.g., in accordance with a user intent) to the elements of the visual scene 120, and provide a filtered view of the visual scene 120 (e.g., in a UX shown on the display 115), where elements of the visual scene are visually indicated (e.g., highlighted, icons added, obfuscated, dimmed, etc.) in accordance with the applied filters.

Following are some examples of visual scenes 120 and elements of those scenes, which are provided for illustration purposes. The elements of the visual scenes described below can be identified and segmented, such as described herein. The segmented elements can then be used (e.g., in conjunction with other information, such a geo-location, a declared user intent, etc.) to determine a context of the visual scene. Filters (as selected by a user) can then be applied to the segmented elements of the visual scene, and a view of the visual scene can be shown on the display 115 of the device 110, with one or more visual indications (e.g., highlights, icons, obfuscation, dimming, etc.) in correspondence with the applied filters. Of course, any number of other visual scenes, and their associated elements could be viewed and filtered by an electronic device implementing the approaches described herein.

In an example implementation, the visual scene 120 could be a restaurant menu and the user could declare an intent that gluten free menu items be shown (e.g., that the menu be filtered to indicate gluten free dishes). The menu (while being viewed real-time with the camera 113) could be analyzed to identify elements of the menu, such as a restaurant name, listings for different dishes, headings, etc. The identified elements could then be segmented, e.g., using machine learning, into individual elements of the visual scene. A context of the visual scene could then be determined as being a menu from the given restaurant (e.g., based on the segmented elements, the declared user intent, and/or a geo-location determined by the electronic device 110, etc.). In some implementations, multiple filters could be applied (e.g., based on the determined context and/or user declared intent). For instance, filters for gluten free menu items and menu items including seafood could be applied, which would result in only gluten free, seafood dishes being shown in a filtered view, e.g., shown on the display 113 in a UX corresponding with the FF block 116. The one or more filters could be applied based on information regarding the menu items that is obtained from the visual scene (e.g., from the text of the menu), from an Internet search, etc. For example, if a Popular Dishes filter is applied, information from online (Internet) reviews could be used to filter the menu items for popular items.

In another example implementation, the visual scene 120 could be a shelf (or shelves) of items in a store and the user could declare an intent that certain types of items be shown (e.g., visually indicated in a filtered view of the visual scene), such as items below a certain price, items including or excluding certain attributes, such as organic items, allergens, etc. The store shelf (or shelves) could then be analyzed to identify elements of that visual scene, such as the shelf (or shelves), products on the shelf (or shelves), price labels, displayed product information, etc. The identified elements could then be segmented as individual elements of the visual scene. A context of the visual scene could then be determined as being a shelf of products in a store based on the segmented elements, the declared user intent, a geo-location, etc. Information regarding the individual products (e.g., ingredients, price, etc.) could then be determined, such as from the elements of the visual scene, and/or from other sources, such as Internet search data, etc.

As some other examples, the approaches described herein could be used to filter a visual scene to find a conference room on a building map, find allergens on a food label, find a specific flight on an airport flight status screen, find a book on a shelf, find a specific plant in a nursery, find a user's keys in a cluttered room, etc. Again, these examples are merely illustrative, and any number of other visual scenes can be viewed and filtered using the approaches described herein. The filters applied to any particular visual scene can be based on information provided by the user, information inferred by previous actions of the user (e.g., allergies, prices sensitivity, etc.), a determined context of a visual scene (using filters suggested to a user based on the determined context, such as a filter to indicate popular dishes in a restaurant menu context). User provided intent could be captured using the microphone 114 of the device 110, or entered as text using, e.g., a virtual keyboard implemented on the display 115, or other data input device (not specifically shown) of the device 110, such as a physical keyboard.

FIGS. 3A, 3B, 3C and 3D are diagrams schematically illustrating a UX 310 of an electronic device 300, according to an example implementation. In some implementations, the device 300 can be used to implement the device 110 of FIG. 1. In FIGS. 3A-3D, example approaches for implementing visual scene filters in a UX, such as the UX 310, are shown. In some implementations, the UX 310, in the device 110, can be part of, and allow control of operations of the FF block 116, such as to implement the approaches described herein.

In each of FIGS. 3A-3D, only a portion of the example UX 310 is shown. For instance, in FIGS. 3A-3C, an upper portion (top portion) of the UX 310 is illustrated, while in FIG. 3D, a lower portion (bottom portion) of the UX 310 is shown. In other UX implementations, other arrangements of such UX elements, or other UX elements are possible.

Figure 3A:
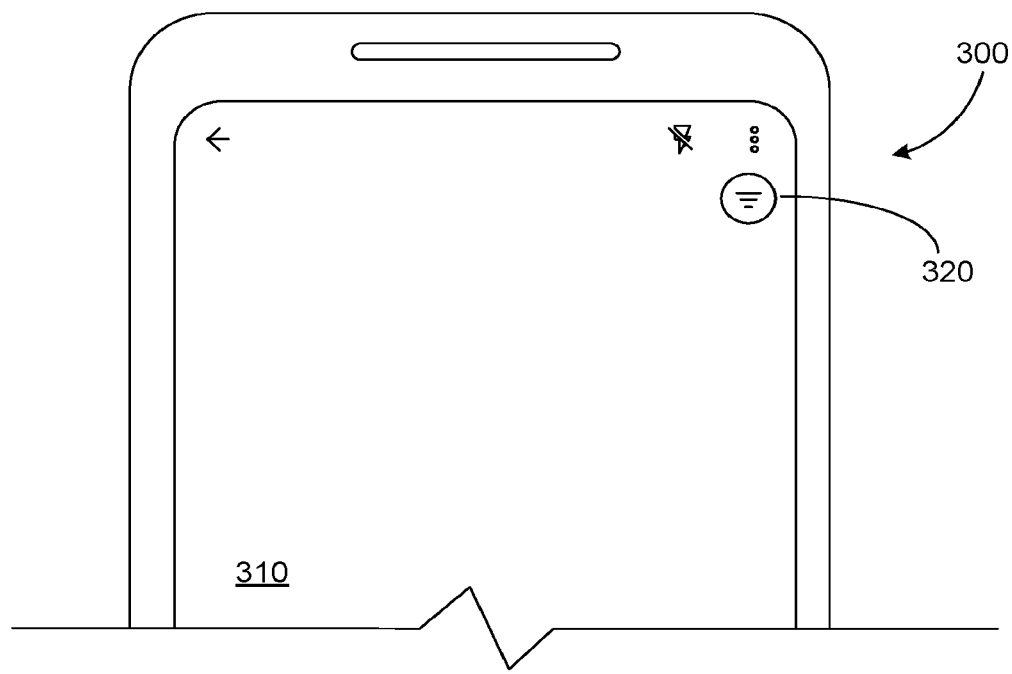
FIGS. 3A, 3B, 3C and 3D are diagrams schematically illustrating a user interface (UX) of an electronic device, according to an example implementation.

As shown in FIG. 3A, the UX 310 can include a persistent filter entry point 320, which a user can utilize to access available filters for a given visual scene. In some implementations, the entry point 320 can be selectively opened and closed in response to a user clicking on the icon (e.g., stacked-line icon) of the entry point 320. In some implementations, the entry point 320 can be opened in response to a filter being enabled elsewhere in the UX 310, such as in the example of FIG. 3D.

As discussed above, visual scene filters (which can be referred to as viewfinder filters, or merely referred to as filters) can be global filters, or contextual filters. For instance, global filters may be available for application (selection, etc.) without an established visual scene context, or regardless of a determined visual scene context. In comparison, contextual filters may only be available for application to visual scenes with a given context (or set of contexts). For instance, a find popular menu items filter would not be presented when viewing a flight status display in an airport, as that filter doesn't match (isn't applicable to) the visual scene context of the flight status display.

Figure 3B:
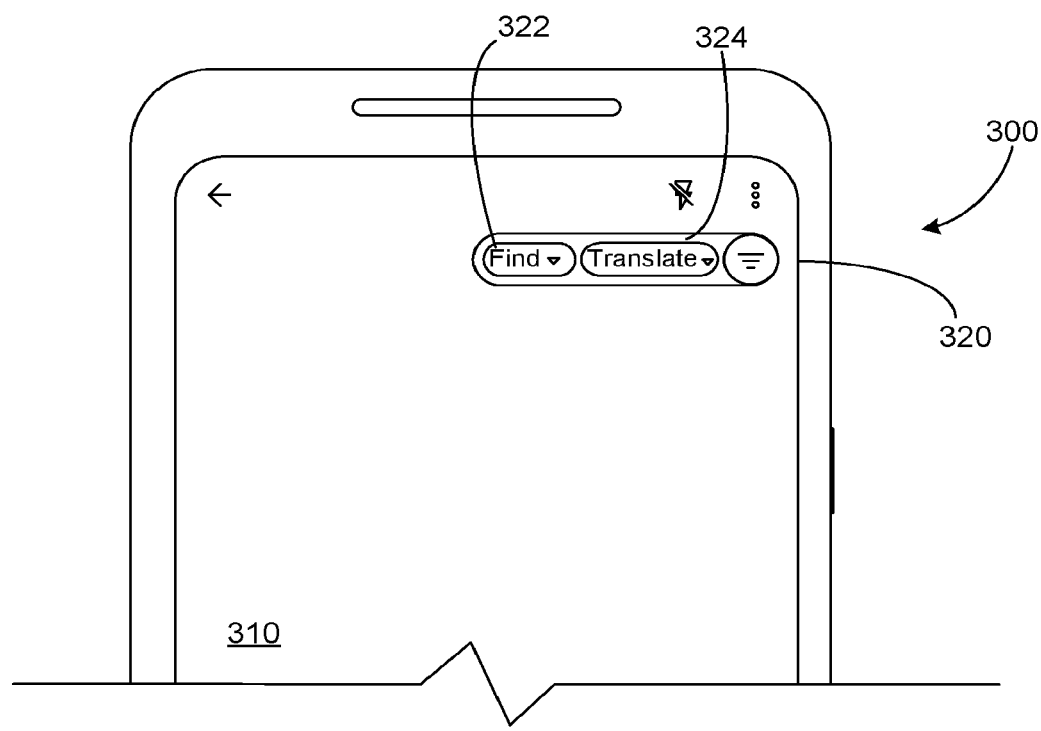

Referring to FIG. 3B, an example of the UX 310 is shown after opening the entry point 320. As shown in FIG. 3B, two buttons (chips, etc.) 322 and 325 corresponding, respectively, with a Find filter and a Translate filter are shown. In some implementations, a user can activate (select, enable, etc.) or deactivate (disable, etc.) these filters by clicking on their respective chips 322 and/or 324. In other implementations, other filters (such as contextual filters) can be enabled or disabled from a separate element (drawer, menu, panel, etc.) of the UX 310, such in the example of FIG. 3D. After enabling such (contextual) filters, respective chips for those filters can be shown in the entry point 320 (e.g., when the entry point 320 is expanded).

In some implementations, configuration options of the Find and Translate (or other available filters) can be accessed by a user selecting (clicking on, tapping, etc.) the corresponding chip (e.g., 322, 324) for the respective filter. Also, a visual indication of which filters are enabled can be provided in entry point 320. For instance, text labels for filters that are enabled can be displayed in a first color (e.g., blue, as shown in FIG. 3B), while text labels for filters that are not enabled can be shown in a second color (e.g., black). In the example of FIG. 3B, as the text labels on both of the chips 322 and 324 are blue, both the Find and Translate filters, in this example, are enabled in the UX 310.

Figure 3C:
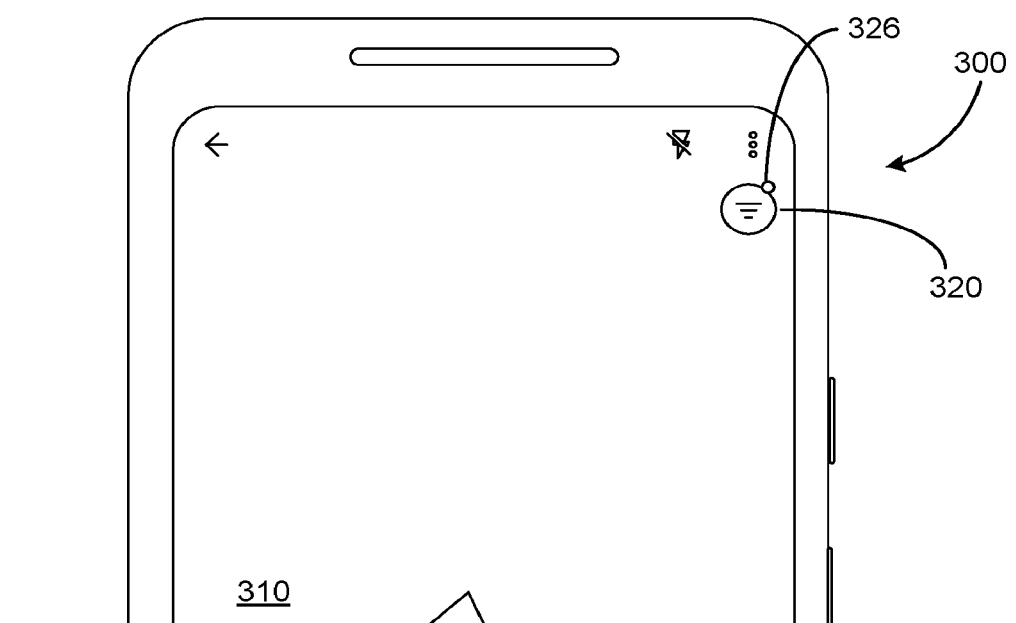
Figure 3D:
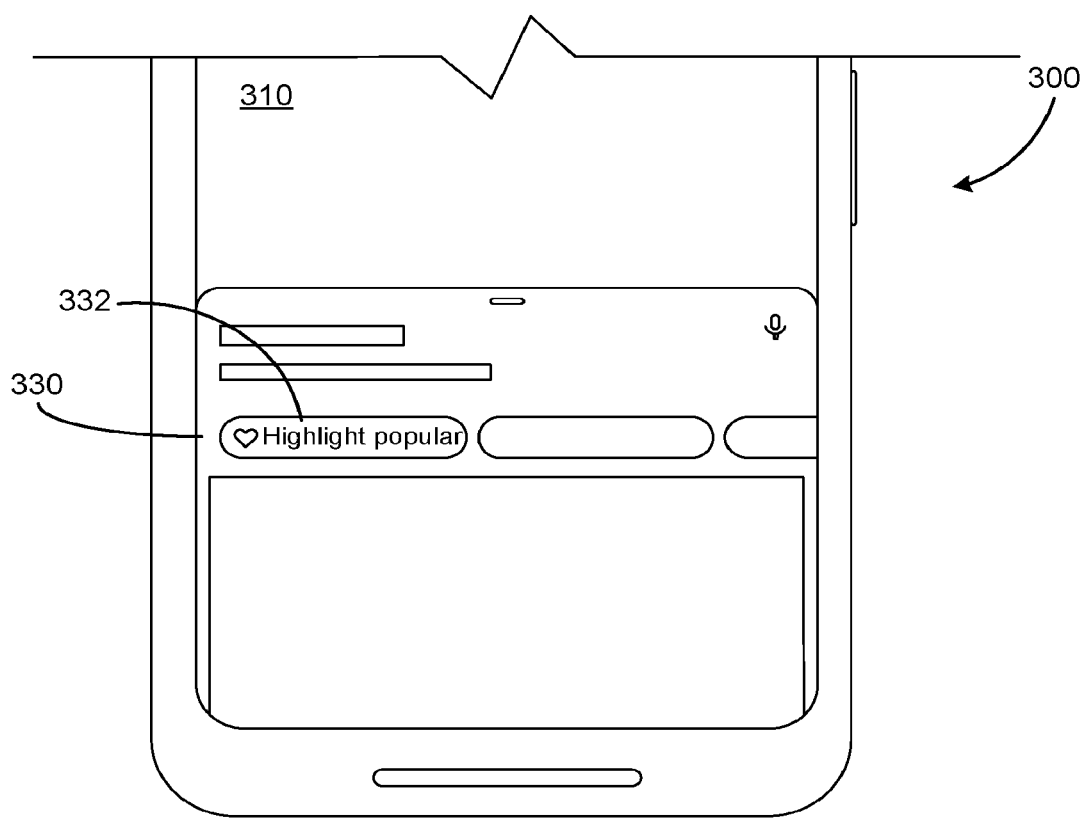

Referring to FIG. 3C, the entry point 320 of the UX 310 is shown in a collapsed view. Also illustrated in FIG. 3C is a visual notification (notification dot) 326, where the visual notification 326 can indicate (e.g., to a user) that additional filters (such as contextual filters based on a determined contact of a visual scene) are available. Selecting (clicking on, tapping, etc.) the entry point 320 with the visual notification 326, in this example, can result in a panel (drawer, etc.) 330 being displayed (opened, etc.) in the UX 310, such as shown in FIG. 3. As illustrated in FIG. 3D, the panel 330 can include (display, etc.) available filters corresponding with the visual notification 326. In the example of FIG. 3D, a Highlight Popular chip 332 (corresponding with a Highlight Popular dishes filter) is shown, such as may be applied in restaurant menu visual scene context is shown. Selecting (clicking on, tapping, etc.) the chip 332 can result in the Highlight Popular filter being activated (enabled, etc.) for a visual scene (e.g., a restaurant menu) being viewed in the UX 310. In some implementations, clicking the chip 332 to enable the Highlight Popular filter can also result in the entry point 320 being expanded, if it is not already, and the Highlight Popular filter being displayed as active (e.g., in blue text) within the expanded entry point 320.

Figure 4A:
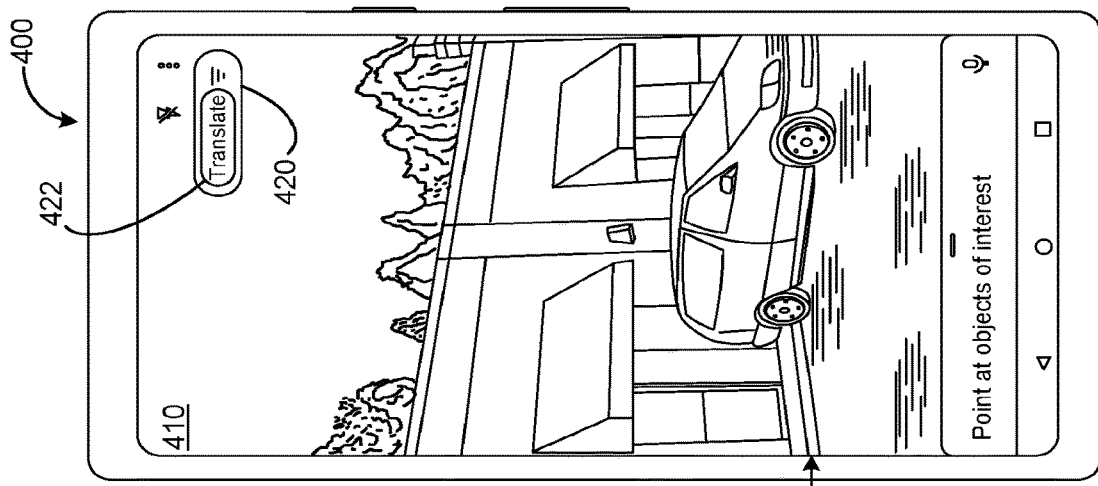
FIGS. 4A, 4B and 4C are diagrams illustrating a sequence of configuring, in a UX of an electronic device, a filter for application to a visual scene, according to an example implementation.
Figure 4B:
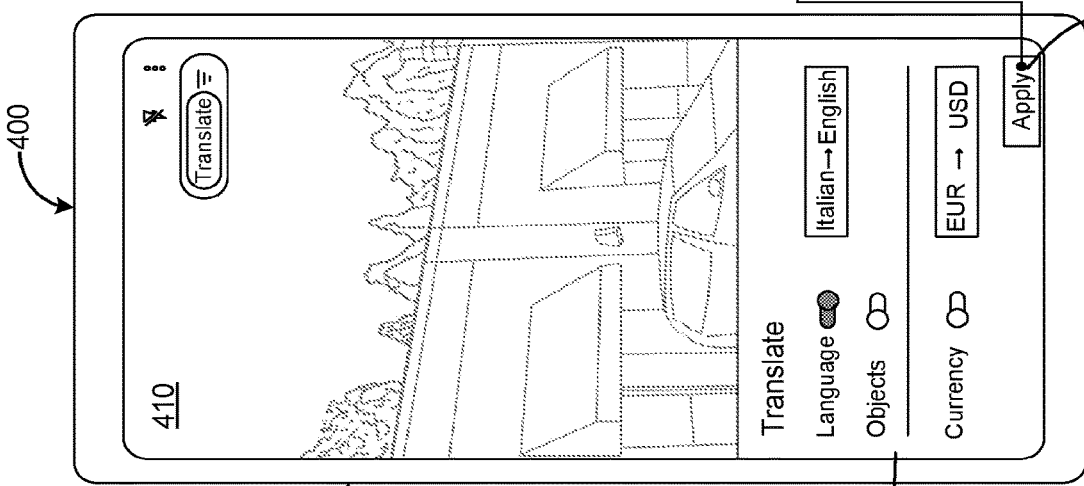
Figure 4C:
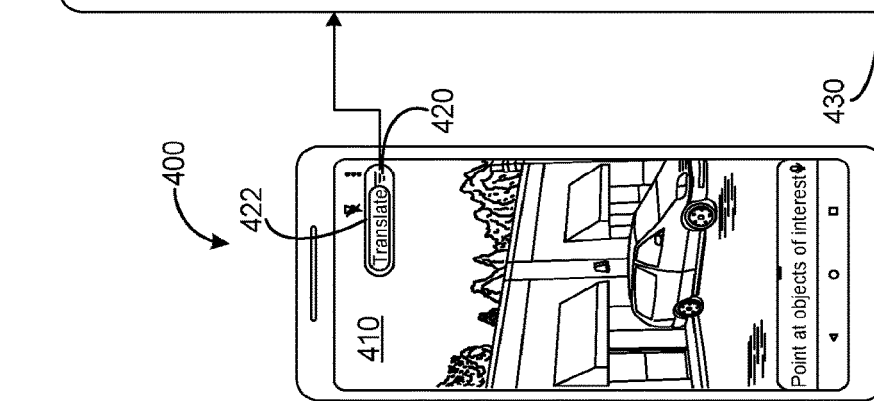

FIGS. 4A, 4B and 4C are diagrams illustrating a sequence for configuring a filter that is applied (to be applied, etc.) to a visual scene in a UX 410 of an electronic device 400, according to an example implementation. As shown in FIG. 4A, the UX 410 includes a persistent entry point 420 for filters that are available to be applied to a visual scene being viewed within the UX 410. In FIG. 4A, the entry point 420 is shown in as being expanded (such as discussed above with respect to the entry point 320) and includes a chip 422 corresponding with a Translate filter. In this example, similar to the UX 310, the text Translate on the chip 422 (e.g., in blue) can indicate that the Translate filter is active in the UX 410 for application to a visual scene that is viewed in the UX 410

In this example, selecting (clicking on, tapping, etc.) the chip 422 in the entry point 420 can result in a panel 430 opening in the UX 410, such as shown in FIG. 4B. In this example, the panel 430 can be used to configure (change and/or add settings of) the Translate filter (e.g., a translate language, a currency conversion, whether to translate text on objects, etc.). In this example, while panel 430 is open, the other elements of the UX 410 can be dimmed, to provide emphasis in the UX 410 on the panel 430. In the UX 410, as shown in FIG. 4B, the panel 430 includes an Apply button 432 that, when tapped (selected, clicked, etc.) can apply the configuration settings selected, or added to the panel 430, to the translate filter, and the panel 430 in the UX 410 can be closed, and the view in the UX 410, as shown in FIG. 4C, can return to a similar view as in FIG. 4, with the chip 422 in the entry point 420 showing that the (newly configured) Translate filter is enabled (e.g., based on the text color) in the UX 410.

Figures 5A, 5B:
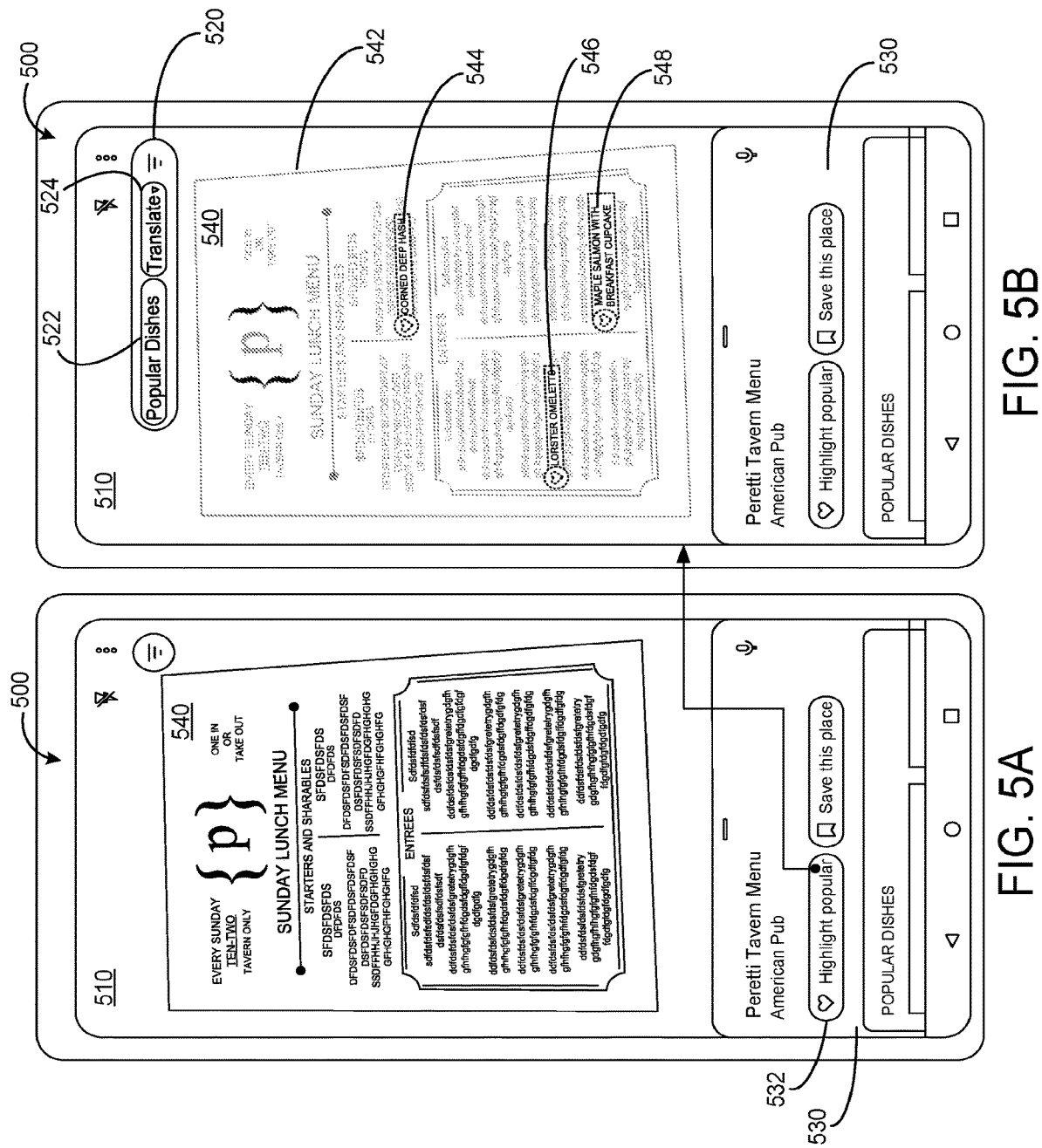
FIGS. 5A, 5B, 5C and 5D are diagrams illustrating a sequence of analyzing and filtering elements of a visual scene in a UX of an electronic device, according to an example implementation.

FIGS. 5A, 5B, 5C and 5D are diagrams illustrating a sequence of analyzing and filtering elements of a visual scene, in accordance with an example implementation. The example of FIGS. 5A-5D is for filtering of a visual scene, where the context of the visual scene is a restaurant menu 540. The sequence of FIGS. 5A-5D is illustrated as being implemented on an electronic device 500 within a UX 510. As shown in FIG. 5A, the UX 510 is illustrated as including a persistent filter entry point 520 (in a collapsed state) and a panel 530 that can display one or more contextual filters that are available for application to the visual scene in the UX 510. For instance, in this example, a chip 532 in the panel indicates that a Highlight popular filter is available to be applied to the menu 540 that is being shown in the UX 510. In some implementations, the panel 530 could be displayed in response to the electronic device determining the context of the visual scene. In some implementations, the panel 530 could be displayed in response to selection of (clicking on, tapping, etc.) the entry point 520 (e.g., after display of a visual notification, such as discussed with respect to FIG. 3C.

In this example, as shown in FIG. 5B, clicking the chip 532 can result in the Highlight popular filter being enabled, the entry point 520 being expanded, and the Popular dishes chip 522 being displayed (e.g., using blue text) in the expanded entry point 520, to indicate that the Highlight popular filter is enabled. Also shown in the expanded entry point 520, is a chip 524 corresponding with a Translate filter. In this example, the Translate filter is indicated as being disabled (e.g., by the black text in the chip 524).

Also, shown in FIG. 5B, in the UX 510, is a highlight 542 around the menu 540. In some implementations, the highlight 542 can indicate that the menu has been recognized as a visual scene to be filtered, and/or that a context (e.g., a restaurant menu 540) has been determined for the visual scene being viewed in the UX 510.

Further in FIG. 5B, visual indicators 544, 546 and 548 corresponding with application of the Highlight popular filter to the menu 540 are shown. In the example of FIG. 5B, the visual indicators 544, 546 and 548 include a highlight over each respective popular dish name, and a heart icon next to each highlighted popular dish name. In some implementations, other visual indications can be used. Also in the UX 510 of FIG. 5B, as compared to FIG. 5A, the nonhighlighted (filtered elements) of the menu 540 are dimmed, which can provide additional visual distinction between the items identified by the Highlight popular filter and the rest of the menu 540. As illustrated in FIG. 5B, in this example, the panel 530 can persist in the UX 510, even after selection of (enabling of) the Highlight popular filter by selecting (clicking on, tapping, etc.) the chip 532 in FIG. 5A.

Figures 5C, 5D:
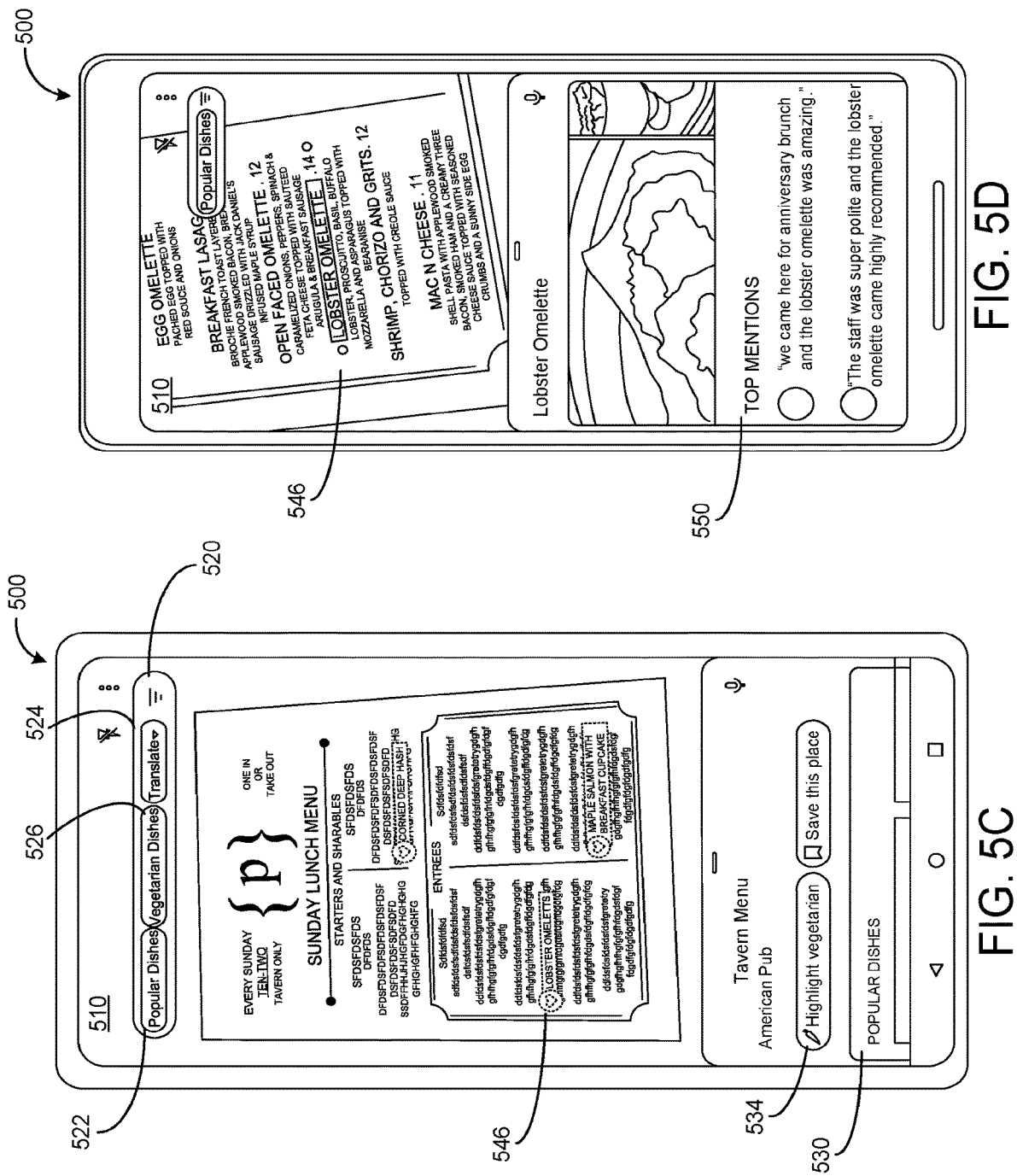

As shown in FIG. 5C, in some implementations, multiple filters (e.g., contextual filters) can be available for application to a visual scene, where the specific contextual filters can depend on content of a visual scene, declared user intent, etc. That is, available contextual filters can be based on a determined context for a visual scene being viewed, e.g., within the UX 510. In the example of FIG. 5C, an additional Highlight vegetarian filter is available, where selection of the corresponding chip 534 in the panel 530 could be used to active the Highlight vegetarian filter. In the example of FIG. 5C, the Highlight vegetarian filter is indicated as being disabled (inactive, etc.) by the Vegetarian Dishes chip 526 (e.g., as indicated by black text in the chip 526) in the entry point 520. In some implementations, other chips can be displayed in the panel 530, such as chips to Search (e.g., the visual scene being viewed), save a browser bookmark for a website associated with the visual scene being viewed, etc.

In this example, as illustrated in FIG. 5D, selection of (clicking on, tapping, etc.) one of the highlighted (filtered) items shown in FIG. 5C (e.g., item 546) can result in the UX 510 providing a zoomed in and/or freeze-frame view of that selected item, as well as displaying a panel 530 that includes information (e.g., from an Internet search) about the selected item 546. In this example, the additional information can include one or more images of the selected item 546, reviews of the selected item 546, though additional or different information could be presented in the panel 550. Also, in some implementation, the panel 550 can take other forms, such as occupying the entire UX 510, add navigation buttons, etc. In some implementations, information in the panel 550 can be displayed in a ranked order (e.g., in order of determine relevance, etc.).

Figure 6:
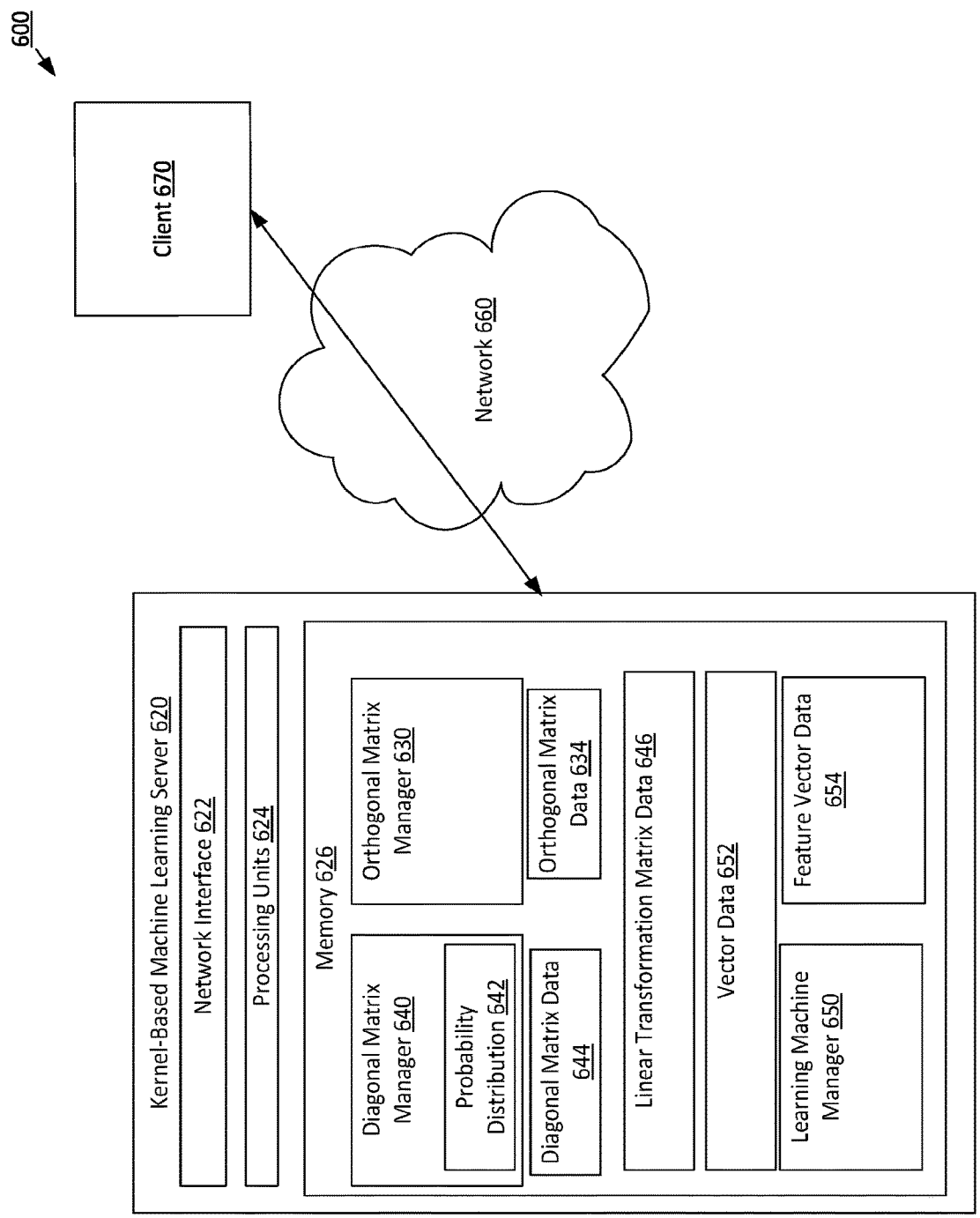
FIG. 6 is block diagram illustrating an example electronic environment, in accordance with an example implementation.

FIG. 6 is a block diagram illustrating a machine learning system 600 that can, in some implementations, be used in approaches for finding and filtering items in a visual scene, such as those described herein. The system 600 can implement machine learning approaches that include generating unbiased estimators for gaussian kernels according to a framework called Structured Orthogonal Random Features (SORF). An unbiased estimator $K_{SORF}$ to the kernel involves a linear transformation matrix $W_{SORF}$ computed using products of a set of pairs of matrices, each pair including an orthogonal matrix and respective diagonal matrix whose elements are real numbers following a specified probability distribution. In some implementations, the orthogonal matrix is a Walsh-Hadamard matrix, the specified probability distribution is a Rademacher distribution, and there are at least two or three pairs of matrices multiplied together to form the linear transformation matrix $W_{SORF}$.

In FIG. 6, the system 600 illustrates an example of a large-scale learning system in accordance with an implementation. In some implementations, such as the approaches described herein, the system 600 may be used to generate a nonlinear map of accurate input vectors that and allow computationally efficient training and testing of a support vector machine (SVM) or other type of kernel-based machine-learning system. These vectors can be an approximation of gaussian kernels, which might be used as input to various machine learning problems, such as a classification system, a clustering system, a regression system, etc. For example, a classification system may use the approximations to classify the data items using a linear classifier. The depiction of system 600 in FIG. 6 is described as a server-based classifier system. However, other configurations and applications may be used. For example, system 600 may be a clustering system, a regression system, an anomaly detection system, etc.

Figure 8:
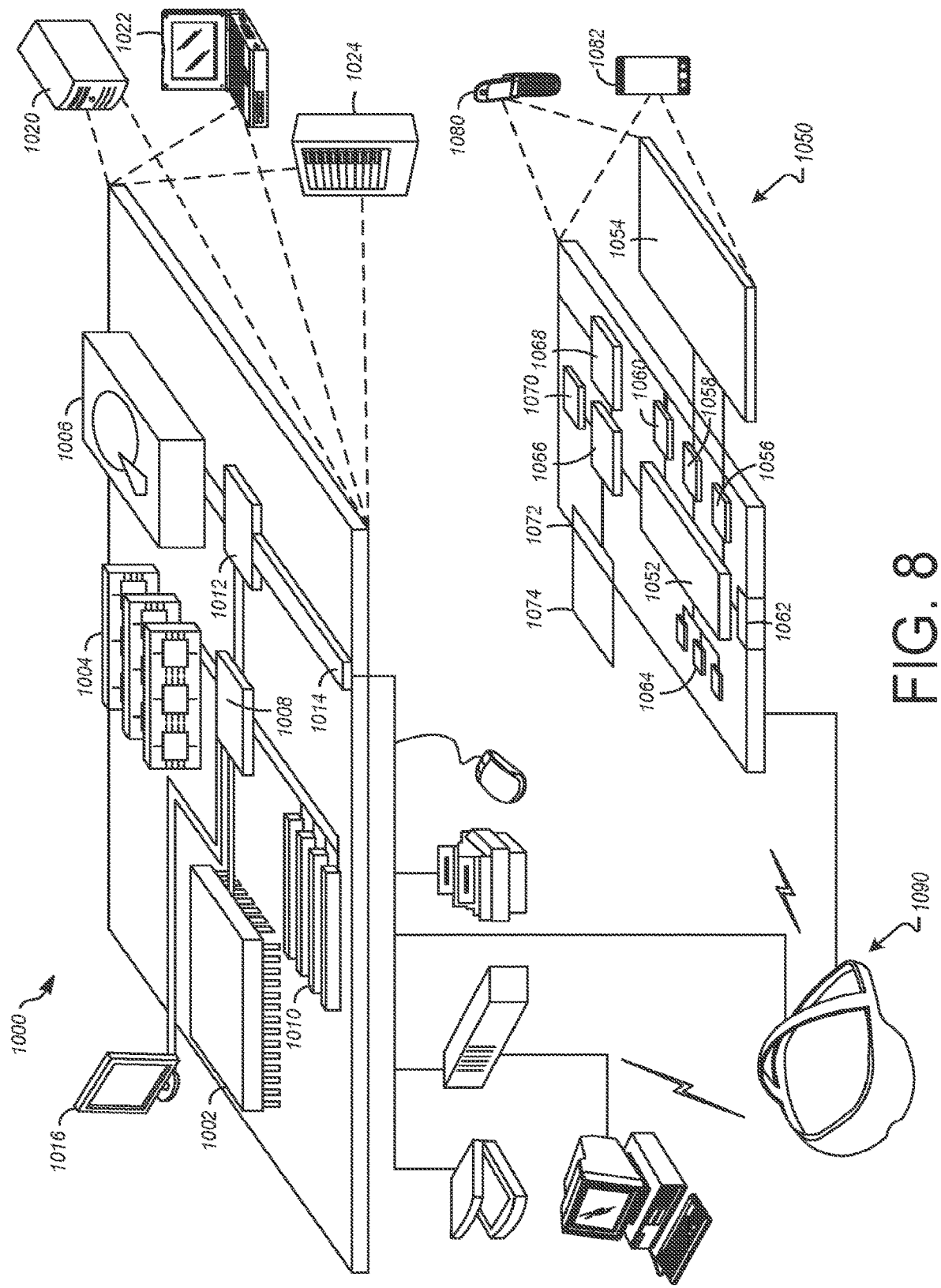
FIG. 8 shows an example of a computer device and a mobile computer device that can be used to implement the techniques described herein.

The large-scale learning system 600 may be a computing device or devices that take the form of a number of different devices, for example a standard server, a group of such servers, or a rack server system, such as kernel-based machine learning server 620. In addition, system 600 may be implemented in a personal computer, for example a laptop computer. The kernel-based machine learning server 620 may be an example of computer device, as depicted in FIG. 8.

The kernel-based machine learning server 620 includes a network interface 622, one or more processing units 624, and memory 626. The network interface 622 includes, for example, Ethernet adaptors, Token Ring adaptors, and the like, for converting electronic and/or optical signals received from the network 670 to electronic form for use by the kernel-based machine learning server 620. The set of processing units 624 include one or more processing chips and/or assemblies. The memory 626 includes both volatile memory (e.g., RAM) and non-volatile memory, such as one or more ROMs, disk drives, solid state drives, and the like. The set of processing units 624 and the memory 626 together form control circuitry, which is configured and arranged to carry out various methods and functions as described herein.

In some embodiments, one or more of the components of the kernel-based machine learning server 620 can be, or can include processors (e.g., processing units 624) configured to process instructions stored in the memory 626. Examples of such instructions as depicted in FIG. 6 include orthogonal matrix manager 630, a diagonal matrix manager 640, and a machine learning manager 650. Further, as illustrated in FIG. 6, the memory 626 is configured to store various data, which is described with respect to the respective managers that use such data.

The kernel-based machine learning server 620 may use feature vectors extracted from data items and generate a randomized feature map that produces an approximation of the features, e.g., via a gaussian kernel. A feature vector may be thought of as an array of floating point numbers with a dimensionality of d, or in other words an array with d positions. The data items may be a database, for example of files or search items. For instance, the data items may be any kind of file, such as documents, images, sound files, video files, etc., and the feature vectors may be extracted from the file. The data items may also be database records and the features may be extracted from data related to an item in the database.

The orthogonal matrix manager 630 is configured to generate orthogonal matrix data 632. The orthogonal matrix data 632 includes numbers defining a matrix or matrices having rows that form an orthogonal basis. The size of an orthogonal matrix generated by the orthogonal matrix manager 632 is based on the dimensionality d. For example, in some implementations the orthogonal matrix manager 630 is configured to generate Walsh-Hadamard matrices. Such matrices are generated according to the following rule:

$$H_1 = \begin{pmatrix} 1 & 1 \\ 1 & -1 \end{pmatrix},$$

$$H_n = H_1 \otimes H_{n-1},$$

where $\otimes$ represents the Kronecker product. Accordingly, Walsh-Hadamard matrices are square matrices having a dimension that is a power of two. In response to receiving The orthogonal matrix manager 630 can then generate a Walsh-Hadamard matrix having a dimension that is the smallest power of two greater than d.

The diagonal matrix manager 640 is configured to generate diagonal matrix data 644. The diagonal matrix data 644 includes numbers defining matrices that have zeroes as off-diagonal elements. The values of the diagonal elements are defined via a specified probability distribution function 642. The dimension of the diagonal matrices is the same as the dimension of the orthogonal matrix of the orthogonal matrix data 632. In some implementations, the values of the diagonal elements are either −1 or 1, and the probability distribution 642 is a Rademacher distribution (i.e., coin-flipping distribution).

The kernel-based machine learning server 620 can be configured to form linear transformation matrix data 646 from the orthogonal matrix data 632 and the diagonal matrix data 644. Along these lines, when the diagonal matrix data 632 includes numbers defining N diagonal matrices $D_1, D_2, \ldots, D_N$, then the linear transformation matrix $W_{SORF}$ defining the linear transformation matrix data 646 is equal to $$W_{SORF} = \frac{\sqrt{d}}{\sigma} H_n D_1 H_n D_2 \ldots H_n D_N,$$

where n is the exponent of the least power of two greater than d, and σ is the width of the gaussian kernel. In some implementations, N is at least 2; in a typical implementation, N is equal to 3.

The system 600 may use the machine learning manager 650 to perform image searches, speech recognition, text recognition, etc., on vector data 652. The system 600 may use conventional methods to extract the vectors from the vector data 652 or may be provided to extracted feature vector data 654. As some examples, the extracted feature vector 654 may be pixels from an image file in the data items or speech waveforms.

In some implementations, the memory 626 can be any type of memory such as a random-access memory, a disk drive memory, flash memory, and/or so forth. In some implementations, the memory 626 can be implemented as more than one memory component (e.g., more than one RAM component or disk drive memory) associated with the components of the kernel-based machine learning server 620. In some implementations, the memory 626 can be a database memory. In some implementations, the memory 626 can be, or can include, a non-local memory. For example, the memory 626 can be, or can include, a memory shared by multiple devices (not shown). In some implementations, the memory 626 can be associated with a server device (not shown) within a network and configured to serve the components of the kernel-based machine learning server 620.

The components (e.g., modules, processing units 624) of the compression computer 620 can be configured to operate based on one or more platforms (e.g., one or more similar or different platforms) that can include one or more types of hardware, software, firmware, operating systems, runtime libraries, and/or so forth. In some implementations, the components of the kernel-based machine learning server 620 can be configured to operate within a cluster of devices (e.g., a server farm). In such an implementation, the functionality and processing of the components of the kernel-based machine learning server 620 can be distributed to several devices of the cluster of devices.

The components of the kernel-based machine learning server 620 can be, or can include, any type of hardware and/or software configured to process attributes. In some implementations, one or more portions of the components shown in the components of the kernel-based machine learning server 620 in FIG. 6 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the kernel-based machine learning server 620 can be, or can include, a software module configured for execution by at least one processor (not shown). In some implementations, the functionality of the components can be included in different modules and/or different components than those shown in FIG. 6.

Although not shown in FIG. 6, in some implementations, the components of the kernel-based machine learning server 620 (or portions thereof) can be configured to operate within, for example, a data center (e.g., a cloud computing environment), a computer system, one or more server/host devices, and/or so forth. In some implementations, the components of the kernel-based machine learning server 620 (or portions thereof) can be configured to operate within a network. Thus, the components of the kernel-based machine learning server 620 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the compression computer 620 can be, or can include, processors configured to process instructions stored in a memory. For example, the orthogonal matrix manager 630 (and/or a portion thereof), the diagonal matrix manager 640 (and/or a portion thereof), and the machine learning manager 650 (and/or a portion thereof) can be a combination of a processor and a memory configured to execute instructions related to a process to implement one or more functions.

Figure 7:
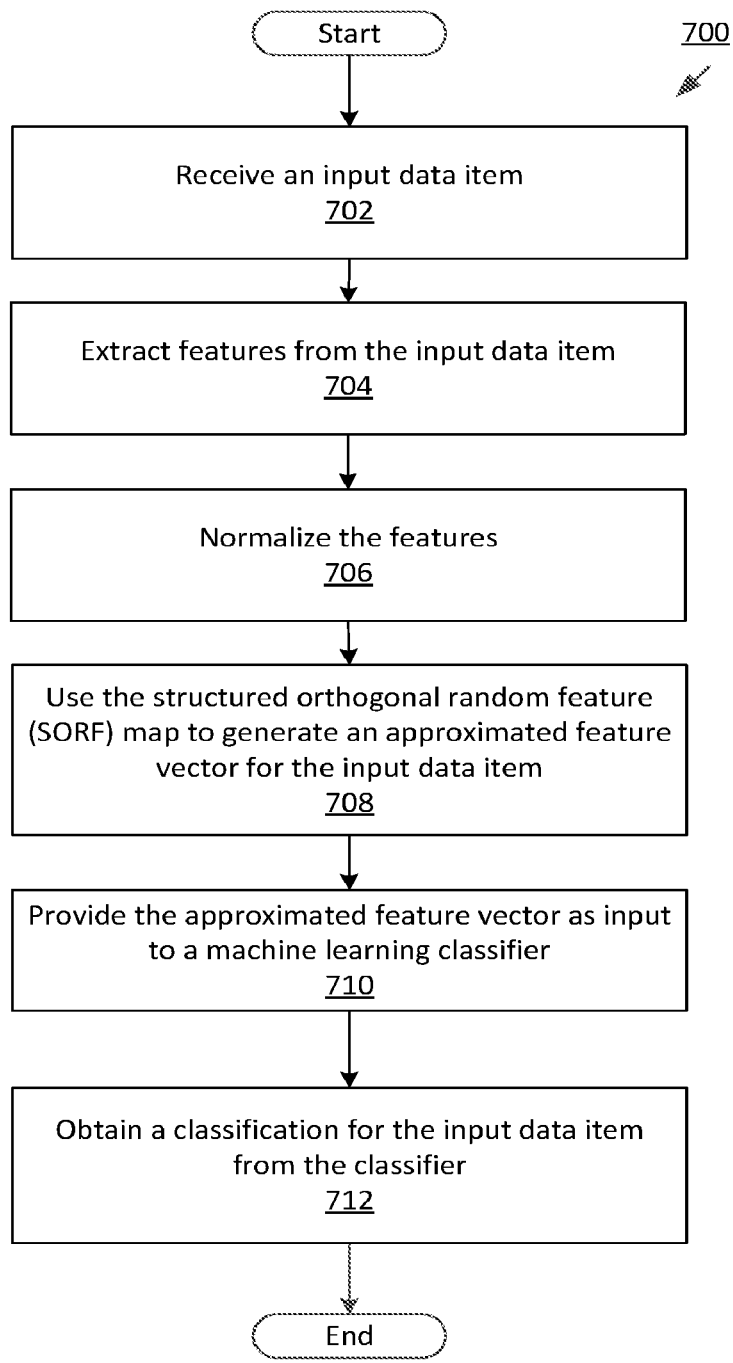
FIG. 7 is a flowchart of an example process for using structured orthogonal random features with a classification engine, according to an example implementation.

FIG. 7 is a flow chart of an example process 700 for using spherical random features with a classification engine, in accordance with disclosed subject matter. Process 700 may be performed by a large-scale learning system, such as system 600 of FIG. 6. Process 700 is an example of transforming an input vector to a second vector, which is a non-linear approximation of an input vector, using the kernel-based machine learning server 120 of FIG. 1. Process 700 may begin with the large-scale learning system receiving an input data item (702). The input data item may be any item from which a feature vector can be extracted. Examples include images, documents, video files, sound files, entities with metadata, user profiles, real-time visual scenes captured with a camera of an electronic device, etc. The system may extract features from the input data item (704) using conventional techniques. The system may normalize the feature vector (706) to a unit $\ell_2$ norm. The system may then use a gaussian randomized feature map (e.g., generated by the system 600) to generate an approximated feature vector for the input data item (708). The approximated feature vector may be a non-linear approximation with a different dimensionality than the input feature vector.

The system may provide the approximated feature vector as input to a classifier (710). The classifier may have access to a large store of data items. The data items may already have corresponding approximated feature vectors or may initiate generation of approximated feature vectors for the data items. In some implementations, the classifier may calculate a dot product between the approximated feature vectors for the input data item and the store of data items. In some implementations, the classifier may use the dot product to determine a label, classification, etc. for the input data item. For example, the classifier may classify an image as an animal, person, building, etc. In some implementations, the classifier may determine items in the data store that are most similar to the input data item. Thus, the system may obtain a classification for the input data item from the classifier (712). Process 700 then ends.

The process of FIG. 7 is one example of using structures orthogonal random features. The feature map (e.g. output from the kernel-based machine learning server 620) can be used in any machine learning application, including but not limited to clustering, regression, anomaly analysis, etc. Thus, for example, an alternate (additional, replacement, etc.) operation 712 may include obtaining a cluster assignment for the input data item, obtaining a regression analysis for the input data item, etc. Moreover, the spherical random features may be used as training examples for the machine learning classifier, e.g., in a training mode that takes place before the process 700 is performed.

FIG. 8 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In-Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with an augmented-reality (AR) headset/AR glasses/head-mounted display (HMD) device 1090 to generate an augmented environment for viewing inserted content, such as the content described above, within a physical space. For example, one or more sensors included on a computing device 1050 or other computing device depicted in FIG. 8, such as the headset 1090 itself, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 (or other device) can use the sensors to determine an absolute position and/or a detected rotation of the computing device in an AR space that can then be used as input to the AR space. For example, the computing device 1050 (or other device) may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connected to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the AR space. In the example of the laser pointer in a AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090.

In some implementations, a computing device 1050 may include a touchscreen. For example, a user can interact with the touchscreen in a particular manner that can mimic what happens on the touchscreen with what happens in the AR space. For example, a user may use a pinching-type motion to zoom content displayed on the touchscreen. This pinching-type motion on the touchscreen can cause information provided in the AR space to be zoomed. In another example, the computing device may be rendered as a virtual book in a computer-generated, 3D environment. In the AR space, the pages of the book can be displayed in the AR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR space to control objects in the AR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:
receiving, by an electronic device, an image captured by a camera of the electronic device, the image including a visual scene;
identifying, by the electronic device, a plurality of elements of the visual scene;
determining, based on the plurality of elements identified in the visual scene and a geographic location of the electronic device, a context of the visual scene;
determining a first filter associated with a translation operation to be applied to the visual scene;
determining a second filter associated with an intent operation to be applied to the visual scene, based on an input of a user specifying criteria associated with a user requirement for an item in the visual scene associated with at least one element among the plurality of elements;
applying, based on the determined context of the visual scene, a combination of the first filter and the second filter to identify at least one element among the plurality of elements to be subjected to the translation operation via the first filter and the intent operation via the second filter, wherein the second filter compares the criteria with respective content associated with each element of the plurality of elements to determine whether the visual scene includes an item which satisfies the criteria; and
visually indicating, in the visual scene on a display of the electronic device, one or more elements among the plurality of elements which are identified by applying the combination of the first filter and the second filter, by modifying the one or more elements, according to the translation operation and the intent operation.

2. The computer-implemented method of claim 1, further comprising:
capturing, by the camera of the electronic device, a real-time view of the visual scene,
wherein the visual scene is provided for presentation on the display in real-time, and
the input of the user specifying the criteria is received while the visual scene is provided for presentation on the display in real-time.

3. The computer-implemented method of claim 1, wherein the translation operation includes a language translation operation to translate text appearing in the visual scene in a first language to text appearing in the visual scene in a second language.

4. The computer-implemented method of claim 3, wherein the language translation operation is configured to translate text appearing on the at least one element, to be subjected to the translation operation, in the visual scene, the at least one element to be subjected to the translation operation corresponding to an object.

5. The computer-implemented method of claim 1, wherein the translation operation includes a currency conversion translation operation to translate a currency amount appearing in the visual scene from a first currency to a second currency.

6. The computer-implemented method of claim 5, wherein the currency amount appears on the at least one element, to be subjected to the translation operation, in the visual scene, the at least one element to be subjected to the translation operation corresponding to an object.

7. The computer-implemented method of claim 1, wherein the intent operation includes at least one of:
determining at least one element among the plurality of elements which is associated with a popularity level indicated by the criteria specified by the user,
determining at least one element among the plurality of elements which is associated with a certain cost indicated by the criteria specified by the user, or
determining at least one element among the plurality of elements which is compatible with preferences of the user indicated by the criteria specified by the user.

8. The computer-implemented method of claim 1, wherein the criteria includes at least one of a popularity of the item, a cost of the item, a text match between text input by the user and text associated with the at least one element to be subjected to the intent operation, or a compatibility between the item and the user.

9. The computer-implemented method of claim 1, wherein modifying the one or more elements among the plurality of elements which are identified using the first filter and the second filter comprises:
translating the one or more elements from a first language to a second language or from a first currency denomination to a second currency denomination; and
highlighting the one or more elements and/or augmenting the one or more elements with a graphical icon.

10. The computer-implemented method of claim 1, further comprising:
visually indicating, in the visual scene on the display of the electronic device, one or more further elements among the plurality of elements which do not satisfy the second filter according to the criteria, by modifying the one or more further elements in a manner different than elements of the visual scene which do satisfy the second filter according to the criteria.

11. The computer-implemented method of claim 10, wherein modifying the one or more further elements comprises removing the one or more further elements from the visual scene or dimming the one or more further elements.

12. The computer-implemented method of claim 1, further comprising:
providing, for presentation on the display, a graphical user interface to receive, from a user of the electronic device, an input to activate the translation operation.

13. An electronic device, comprising:
a display;
a camera configured to capture an image including a visual scene,
a memory configured to store instructions; and
a processor configured to execute the instructions to cause the electronic device to:
receive the image including the visual scene;
identify a plurality of elements of the visual scene;
determine, based on the plurality of elements identified in the visual scene and a geographic location of the electronic device, a context of the visual scene;
determine a first filter associated with a translation operation to be applied to the visual scene;
determine a second filter associated with an intent operation to be applied to the visual scene, based on an input of a user specifying criteria associated with a user requirement for an item in the visual scene associated with at least one element among the plurality of elements;

apply, based on the determined context of the visual scene, a combination of the first filter and the second filter to identify at least one element among the plurality of elements to be subjected to the translation operation via the first filter and the intent operation via the second filter, wherein the second filter compares the criteria with respective content associated with each element of the plurality of elements to determine whether the visual scene includes an item which satisfies the criteria; and visually indicate, in the visual scene on the display, one or more elements among the plurality of elements which are identified by applying the combination of the first filter and the second filter, by modifying the one or more elements, according to the translation operation and the intent operation.

14. The electronic device of claim 13, wherein
the camera is configured to capture a real-time view of the visual scene,
the visual scene is provided for presentation on the display in real-time, and
the input of the user specifying the criteria is received while the visual scene is provided for presentation on the display in real-time.

15. The electronic device of claim 13, wherein
the translation operation includes a language translation operation to translate text appearing in the visual scene in a first language to text appearing in the visual scene in a second language, and
the language translation operation is configured to translate text appearing on the at least one element, to be subjected to the translation operation, in the visual scene, the at least one element, to be subjected to the translation operation, corresponding to an object.

16. The electronic device of claim 13, wherein
the translation operation includes a currency conversion translation operation to translate a currency amount appearing in the visual scene from a first currency to a second currency, and
the currency amount appears on the at least one element, to be subjected to the translation operation, in the visual scene, the at least one element, to be subjected to the translation operation, corresponding to an object.

17. The electronic device of claim 13, wherein the intent operation includes at least one of:
determining at least one element among the plurality of elements which is associated with a popularity level indicated by the criteria specified by the user,
determining at least one element among the plurality of elements which is associated with a certain cost indicated by the criteria specified by the user, or
determining at least one element among the plurality of elements which is compatible with preferences of the user indicated by the criteria specified by the user.

18. The electronic device of claim 17, wherein modifying the one or more elements among the plurality of elements which are identified using the first filter and the second filter comprises:
translating the one or more elements from a first language to a second language; and
highlighting the one or more elements and/or augmenting the one or more elements with a graphical icon.

19. The electronic device of claim 17, wherein the processor is configured to execute the instructions to cause the electronic device to:
visually indicate, in the visual scene on the display of the electronic device, one or more further elements among the plurality of elements which do not satisfy the second filter according to the criteria, by modifying the one or more further elements in a manner different than elements of the visual scene which do satisfy the second filter according to the criteria, and
wherein modifying the one or more further elements comprises removing the one or more further elements from the visual scene or dimming the one or more further elements.

20. A non-transitory computer-readable medium configured to store instructions that, when executed by a processor of an electronic device, cause the electronic device to:
receive an image captured by a camera of the electronic device, the image including a visual scene;
identify a plurality of elements of the visual scene;
determine, based on the plurality of elements identified in the visual scene and a geographic location of the electronic device, a context of the visual scene;
determine a first filter associated with a translation operation to be applied to the visual scene;
determine a second filter associated with an intent operation to be applied to the visual scene, based on an input of a user specifying criteria associated with a user requirement for an item in the visual scene associated with at least one element among the plurality of elements;
apply, based on the determined context of the visual scene, a combination of the first filter and the second filter to identify at least one element among the plurality of elements to be subjected to the translation operation via the first filter and the intent operation via the second filter, wherein the second filter compares the criteria with respective content associated with each element of the plurality of elements to determine whether the visual scene includes an item which satisfies the criteria; and
visually indicate, in the visual scene on a display of the electronic device, one or more elements among the plurality of elements which are identified by applying the first filter and the second filter, by modifying the one or more elements, according to the translation operation and the intent operation.

* * * * *